United States Patent
Namburu et al.

(10) Patent No.: US 11,997,779 B2
(45) Date of Patent: May 28, 2024

(54) LIQUID COOLED PLASMA ARC TORCH

(71) Applicant: Lincoln Global, Inc., Santa Fe Springs, CA (US)

(72) Inventors: Praveen K. Namburu, Little Elm, TX (US); Wayne S. Severance, Jr., Darlington, SC (US); Matthew E. Train, Mount Pleasant, SC (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 641 days.

(21) Appl. No.: 17/060,203

(22) Filed: Oct. 1, 2020

(65) Prior Publication Data

US 2021/0144837 A1    May 13, 2021

Related U.S. Application Data

(60) Provisional application No. 62/932,550, filed on Nov. 8, 2019.

(51) Int. Cl.
*H05H 1/34* (2006.01)
*B23K 10/00* (2006.01)
(Continued)

(52) U.S. Cl.
CPC ............. *H05H 1/34* (2013.01); *B23K 10/006* (2013.01); *B23K 26/1435* (2013.01);
(Continued)

(58) Field of Classification Search
CPC .. H05H 1/3423; H05H 1/3436; H05H 1/3442; H05H 1/3478
(Continued)

(56) References Cited

U.S. PATENT DOCUMENTS

| 4,055,741 A | 10/1977 | Bykhovsky et al. |
| 4,571,475 A | 2/1986 | Rabe |

(Continued)

FOREIGN PATENT DOCUMENTS

| CN | 103458602 A | 12/2013 |
| JP | H06-312269 A | 11/1994 |
| WO | 2012/021236 A1 | 2/2012 |

OTHER PUBLICATIONS

Extended European Search Report for Corresponding Application No. 20206134.7; dated Apr. 9, 2021; pp. 1-9.
(Continued)

*Primary Examiner* — Vy T Nguyen
(74) *Attorney, Agent, or Firm* — Brad C. Spencer

(57) ABSTRACT

A plasma arc torch includes a cathode extending along an axis of the torch, a pilot arc conductor, and a nozzle body. A first fluid conduit and second fluid conduit extend parallel to the axis of the torch. A first offset fitting includes a first duct coupled to and in fluid communication with the first fluid conduit, and a second duct in fluid communication with the first duct and outwardly radially offset from the first duct and extending away from the first duct in a proximal direction. A second offset fitting includes a third duct coupled to and in fluid communication with the second fluid conduit, and a fourth duct in fluid communication with the third duct and outwardly radially offset from the third duct and extending away from the third duct in the proximal direction. A spring compression plug electrically connects the pilot arc conductor to the nozzle body.

14 Claims, 7 Drawing Sheets

(51) Int. Cl.
*B23K 26/14* (2014.01)
*B23K 31/10* (2006.01)
*B23Q 15/08* (2006.01)
*B23Q 15/12* (2006.01)
*H05H 1/28* (2006.01)

(52) U.S. Cl.
CPC .............. *B23K 31/10* (2013.01); *B23Q 15/08* (2013.01); *B23Q 15/12* (2013.01); *H05H 1/28* (2013.01); *H05H 1/3494* (2021.05); *B23K 10/003* (2013.01); *H05H 1/3421* (2021.05); *H05H 1/3436* (2021.05); *H05H 2242/10* (2013.01)

(58) Field of Classification Search
USPC ........................................ 219/121.48, 121.52
See application file for complete search history.

(56) References Cited

U.S. PATENT DOCUMENTS

| | | | |
|---|---|---|---|
| 5,120,026 A | | 6/1992 | Bissonnette |
| 5,521,350 A | | 5/1996 | Nishi et al. |
| 5,874,707 A | * | 2/1999 | Iida ..................... H05H 1/3423 219/121.36 |
| 6,268,583 B1 | | 7/2001 | Yamaguchi et al. |
| 6,274,842 B1 | | 8/2001 | Warren et al. |
| 8,420,975 B2 | | 4/2013 | Yamaguchi et al. |
| 9,313,871 B2 | | 4/2016 | Namburu et al. |
| 9,681,528 B2 | | 6/2017 | Namburu |
| 2001/0007320 A1 | * | 7/2001 | Severance, Jr. ...... H05H 1/3423 219/121.48 |
| 2004/0195219 A1 | | 10/2004 | Conway et al. |
| 2005/0077271 A1 | | 4/2005 | Delzenne |
| 2008/0093346 A1 | | 4/2008 | Yamaguchi et al. |
| 2015/0251267 A1 | | 9/2015 | Winn et al. |
| 2016/0219688 A1 | | 7/2016 | Carletti et al. |
| 2016/0375519 A1 | | 12/2016 | Crowe |
| 2017/0042011 A1 | | 2/2017 | Sanders et al. |
| 2017/0095877 A1 | | 4/2017 | Ames et al. |
| 2018/0133828 A1 | | 5/2018 | Pike et al. |
| 2018/0319835 A1 | | 11/2018 | Park et al. |
| 2019/0009356 A1 | | 1/2019 | Severance, Jr. et al. |
| 2020/0196426 A1 | * | 6/2020 | Sanders ........... G06K 19/07773 |

OTHER PUBLICATIONS

Extended European Search Report for Corresponding Application No. 20206129.7; dated Apr. 9, 2021; pp. 1-8.

* cited by examiner

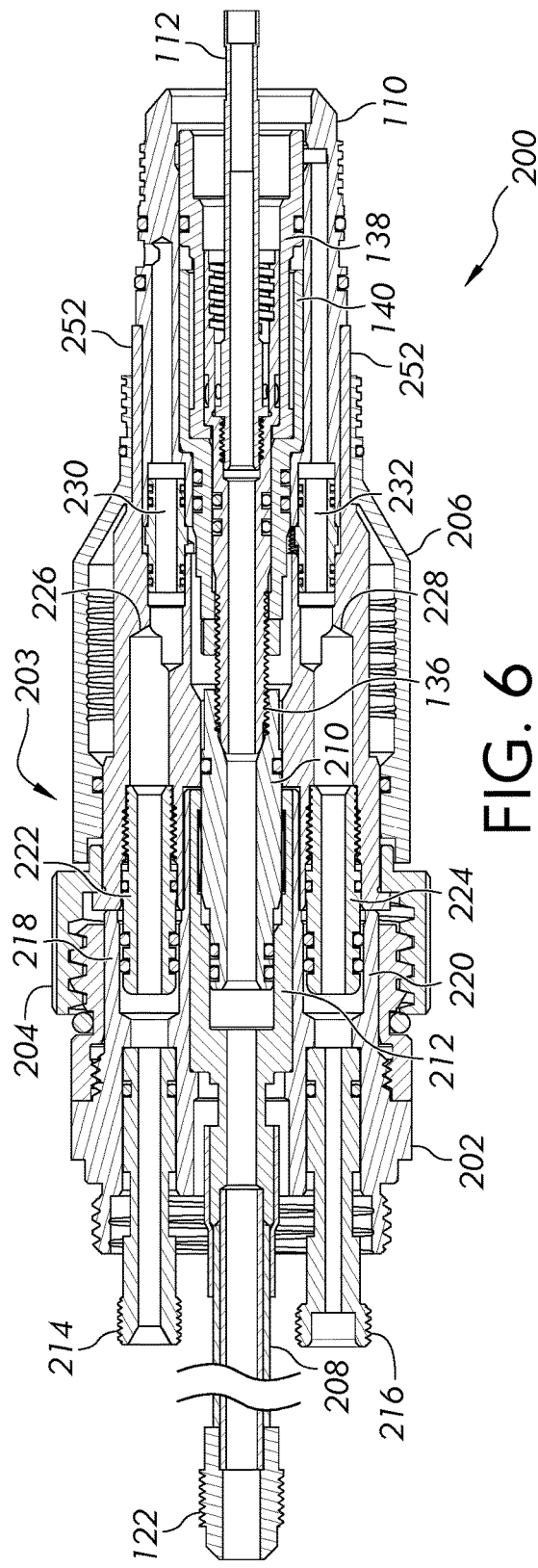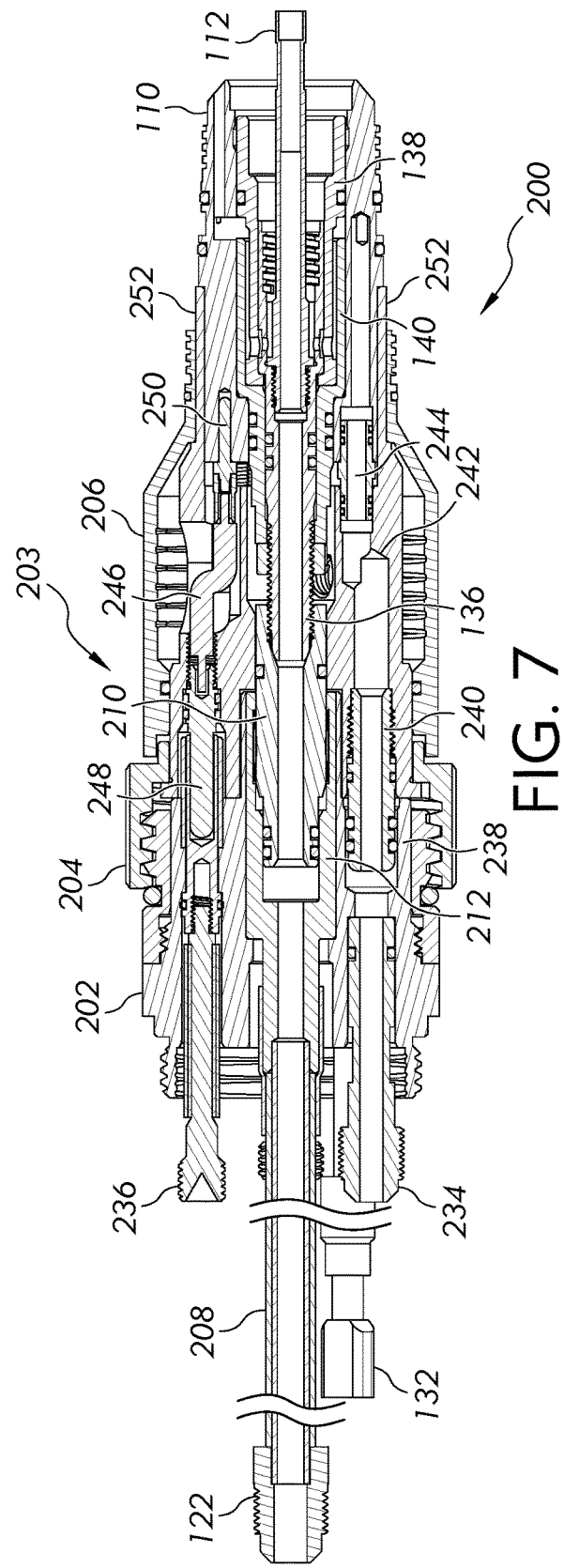

LIQUID COOLED PLASMA ARC TORCH

CROSS-REFERENCE TO RELATED APPLICATIONS

The present application claims priority to U.S. Provisional Patent Application Ser. No. 62/932,550 filed on Nov. 8, 2019, the disclosure of which is incorporated herein by reference.

BACKGROUND OF THE INVENTION

Field of the Invention

The present invention relates to liquid cooled plasma arc torches for cutting workpieces using a plasma arc.

Description of Related Art

In many cutting operations, plasma arc torches are utilized. These torches operate at very high temperatures which can damage many components of the torches. As such, some torches use liquid cooling to transfer the heat away from some of the cutting torch components. The cooling liquid is passed through various fluid chambers within the torch and then returned from the torch and recirculated. Plasma arc torches may utilize both plasma gas and shielding gas during operation, and may include high frequency starting circuitry for initiating the arc. Thus, plasma arc torches may include internal conduits for the different fluids passing through the torch (e.g., cooling liquid and plasma and shield gas) and a conductor for initiating the arc. Such structure affects the diameter or width of the torch. A narrower torch design is generally desirable because narrower torches can be used more easily in "tight" spaces, for example within interior corners of workpieces. One example workpiece having interior corners that may be difficult to cut is a wide flange beam (e.g., W beam or H beam) or an I-beam having wide flanges, which has interior corners where the beam flanges meet the central web. The width of conventional torches can make maneuvering such torches within the interior corners of the workpiece difficult. A narrower torch design is also desirable as it allows the use of smaller diameter consumables (e.g., electrode, nozzle, swirl ring, etc.), thereby reducing the cost of the torch and the consumables. Further limitations and disadvantages of conventional liquid cooled plasma arc torches will become apparent to one of skill in the art, through comparison of such torches with embodiments of the present invention as set forth in the remainder of the present application with reference to the drawings.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a plasma arc torch. The plasma arc torch includes a cathode extending along an axis of the torch, a pilot arc conductor, and a nozzle body. A first fluid conduit within the torch extends parallel to the axis of the torch. A second fluid conduit within the torch extends parallel to the axis of the torch. A first offset fitting includes a first duct in fluid communication with the first fluid conduit, and a second duct in fluid communication with the first duct. The first duct is coupled to the first fluid conduit, and the second duct is outwardly radially offset from the first duct and extends away from the first duct in a proximal direction, parallel to the axis of the torch. A second offset fitting includes a third duct in fluid communication with the second fluid conduit, and a fourth duct in fluid communication with the third duct. The third duct is coupled to the second fluid conduit, and the fourth duct is outwardly radially offset from the third duct and extends away from the third duct in the proximal direction, parallel to the axis of the torch. A spring compression plug electrically connects the pilot arc conductor to the nozzle body.

In accordance with another aspect of the present invention, provided is a plasma arc torch. The plasma arc torch includes a cathode extending along an axis of the torch and having a first plurality of cooling liquid apertures, a nozzle, and a nozzle body having an internal cooling liquid channel that conveys cooling liquid toward the nozzle. An inner isolator has a second plurality of cooling liquid apertures in fluid communication with the first plurality of cooling liquid apertures. An outer isolator is radially offset from the inner isolator to form an interstitial space through which the cooling liquid is conveyed into nozzle body. A distal terminal end of the outer isolator is radially offset from the inner isolator such that the interstitial space extends to the distal terminal end of the outer isolator. The inner isolator and the outer isolator electrically insulate the nozzle body from the cathode. The torch further includes a cooling liquid return conduit, and a cooling liquid return offset fitting including a first cooling liquid return duct in fluid communication with the cooling liquid return conduit, and a second cooling liquid return duct in fluid communication with the first cooling liquid return duct. The first cooling liquid return duct is coupled to the cooling liquid return conduit, and the second cooling liquid return duct is outwardly radially offset from the first cooling liquid return duct and extends away from the first cooling liquid return duct in a proximal direction, parallel to the axis of the torch.

In accordance with another aspect of the present invention, provided is a plasma arc torch. The plasma arc torch includes a cathode extending along an axis of the torch, a pilot arc conductor, a nozzle body, a plasma gas conduit, a shield gas conduit, and a cooling liquid return conduit. A plasma gas offset fitting includes a first plasma gas duct in fluid communication with the plasma gas conduit, and a second plasma gas duct in fluid communication with the first plasma gas duct. The second plasma gas duct is outwardly radially offset from the first plasma gas duct and extends away from the first plasma gas duct in a proximal direction, parallel to the axis of the torch. A shield gas offset fitting includes a first shield gas duct in fluid communication with the shield gas conduit, and a second shield gas duct in fluid communication with the first shield gas duct. The second shield gas duct is outwardly radially offset from the first shield gas duct and extends away from the first shield gas duct in the proximal direction, parallel to the axis of the torch. A cooling liquid return offset fitting includes a first cooling liquid return duct in fluid communication with the cooling liquid return conduit, and a second cooling liquid return duct in fluid communication with the first cooling liquid return duct. The second cooling liquid return duct is outwardly radially offset from the first cooling liquid return duct and extends away from the first cooling liquid return duct in the proximal direction, parallel to the axis of the torch. A spring compression plug electrically connects the pilot arc conductor to the nozzle body.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 6 is a cross-sectional view of a second embodiment of the plasma arc torch;

FIG. 7 is a cross-sectional view of the second embodiment of the plasma arc torch;

DETAILED DESCRIPTION OF THE INVENTION

Figure 1:
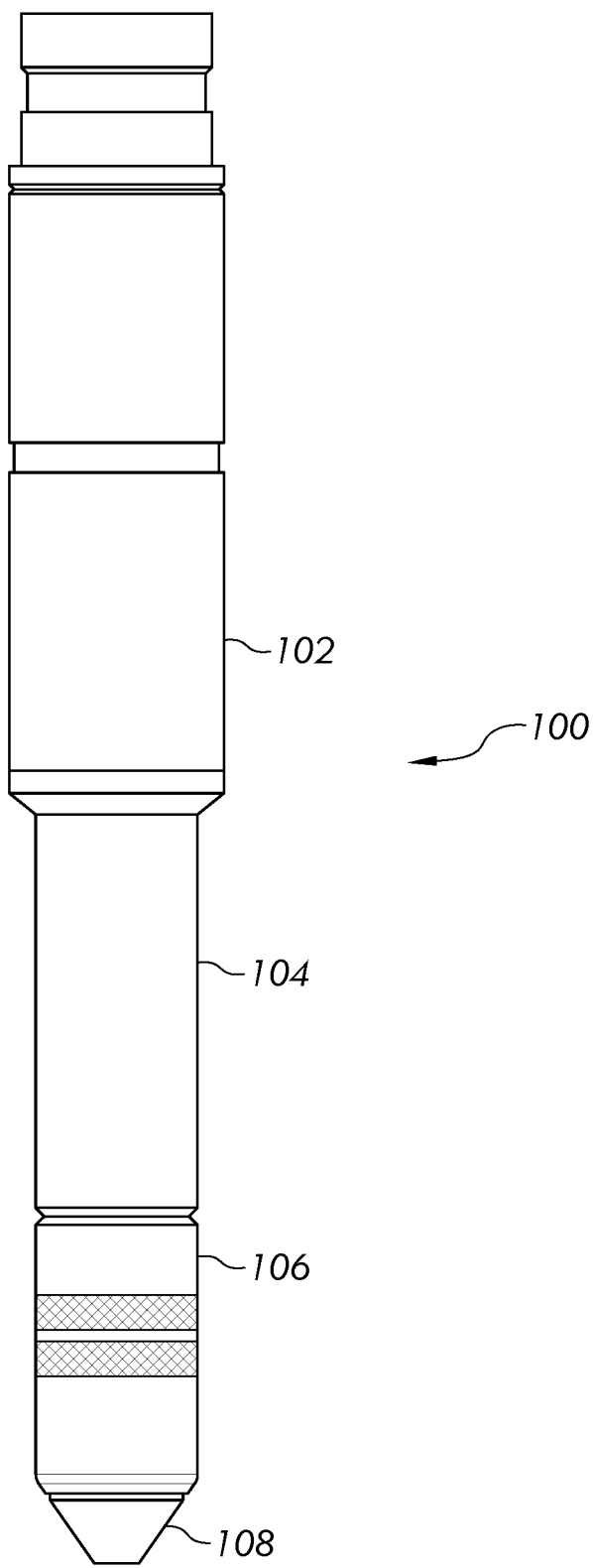
FIG. 1 shows a plasma arc torch.

The present invention relates to plasma arc torches. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Discussed herein are plasma arc torches that have, among other things, fluid and electrical connections at an upstream end of the torch and a nozzle and shield cap at a downstream or cutting end of the torch. The term "proximal" as used herein refers to the upstream direction of the torch, toward the end of the torch having the fluid and electrical connections. The term "distal" as used herein refers to the downstream direction of the torch, toward the cutting end of the torch.

FIG. 1 shows an example plasma arc or plasma cutting torch 100. The plasma arc torch 100 is a liquid-cooled torch that has a narrow proximal end and an even narrower distal end. The torch 100 is attached to a handle portion 102. The handle portion 102 can be clamped into an automated cutting device, such as computer numerical control (CNC) plasma cutting table or a robotic arm for example. Distal of the handle portion 102 is a torch body 104. The torch body 104 can be made from a metallic material and forms the majority of the outer portion of the torch 100. In an example embodiment, the torch body 104 is made from brass. However, the torch body could be made from various metals and alloys as would be appreciated by one of ordinary skill in the art. Attached to the torch body 104 is an outer retaining cap 106 that secures a shield cap 108 to the torch 100.

In an example embodiment, the length of the torch 100 (from the bottom of the handle portion 102 to the top of the shield cap 108) can be about 7 inches or 178 mm, and the width of the torch can be about 1.5 inches or 38 mm. It is to be appreciated that the length and width of the torch 100 is exemplary and that other sizes are possible. The narrow width of the torch 100 combined with its length can facilitate maneuvering the torch near and cutting certain workpieces having perpendicular members or interior corners. Examples of such workpieces include wide flange beams (e.g., W beams or H beams having wide flanges of about 14 inches in length), I-beams, or other metallic workpieces having interior corners (e.g., bulkheads). The handle portion 102 can be about 2 inches or 51 mm wide. By making the diameter of the torch 100 small, small diameter consumables (e.g., electrode, nozzle, swirl ring, etc.) can be used in the torch, which reduces the cost of the torch and the cost of the consumables, which must be replaced from time to time.

Figure 2:
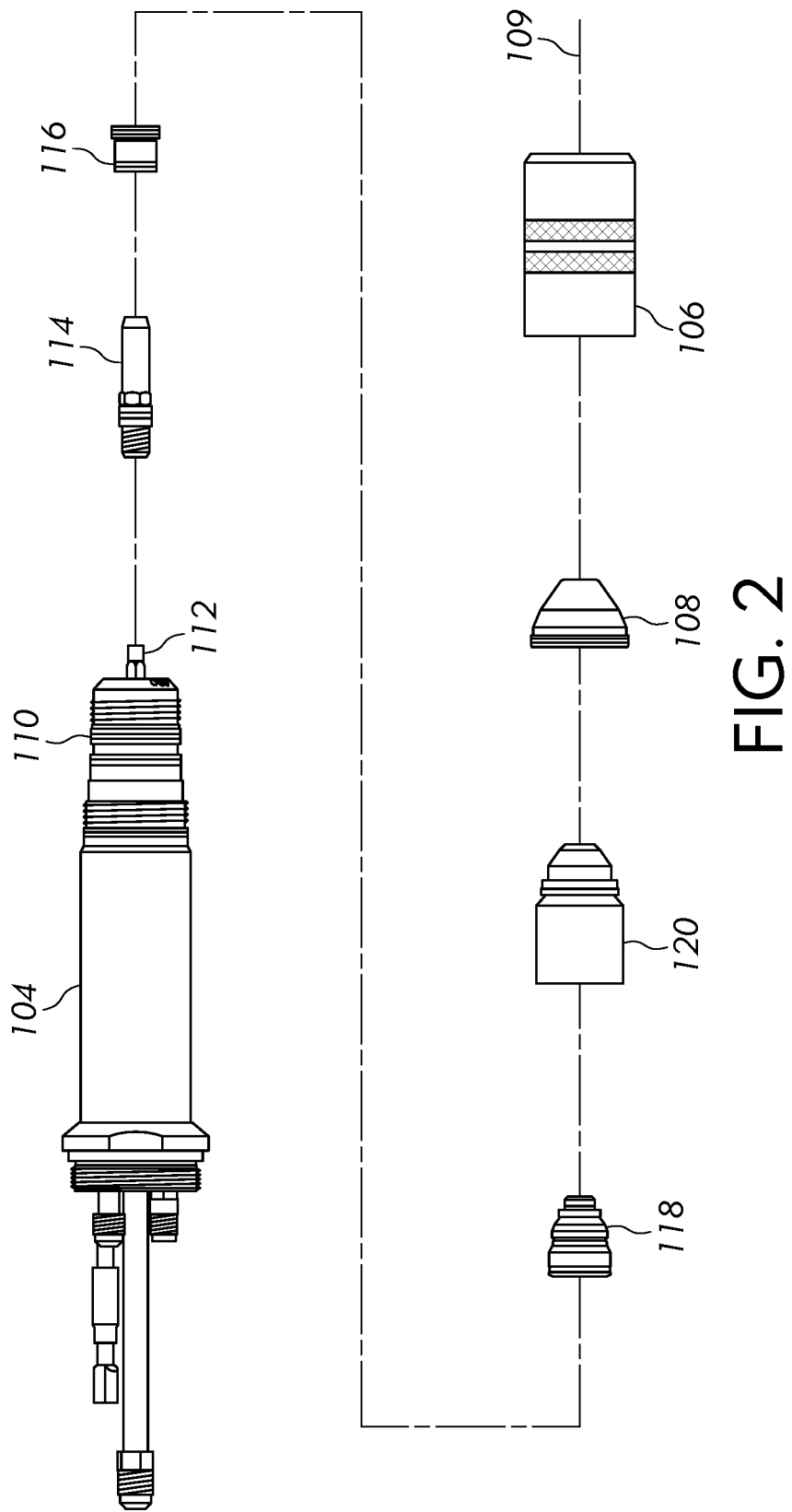
FIG. 2 is an exploded view showing components of the plasma arc torch.

FIG. 2 is an exploded view of the torch showing various components and consumables of the torch displayed along an axis 109 of the torch. The torch body 104, outer retaining cap 106, and shield cap 108 are shown in FIG. 2. Extending from the torch body 104 is a nozzle body 110 or anode, and a cooling tube 112. The cooling tube 112 attaches to a cathode within the torch, as does the electrode 114. The torch further includes a swirl ring 116 and nozzle 118. The swirl ring 116 and nozzle 118 are held in place by an inner retaining cap 120 that threads onto the nozzle body 110. The electrode 114, swirl ring 116, nozzle 118, inner retaining cap 120, shield cap 108, and outer retaining cap 106 can all be considered consumables of the torch 100.

Figure 3:
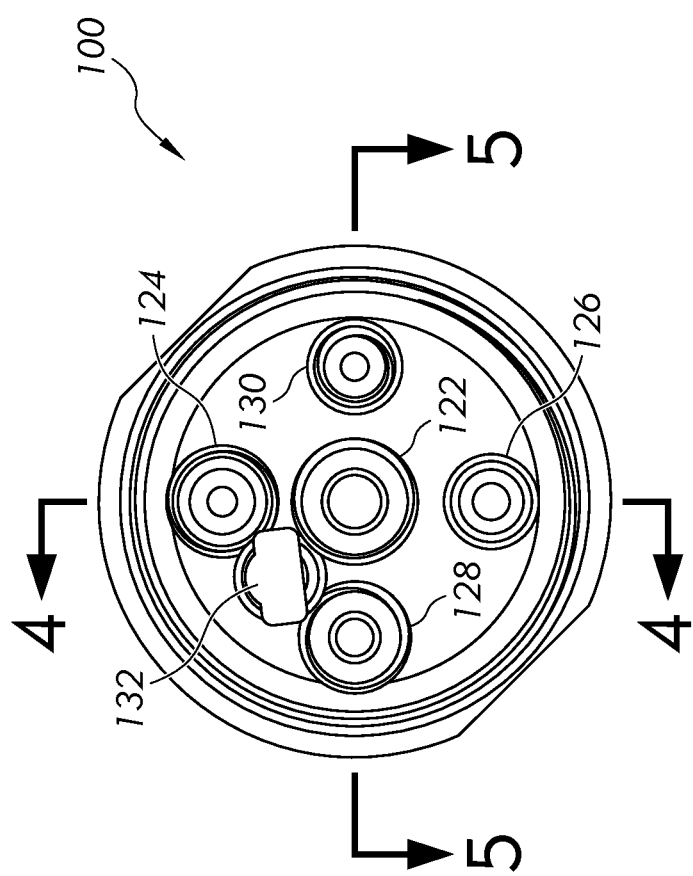
FIG. 3 is an end view of the plasma arc torch.

FIG. 3 shows a proximal end view of the plasma arc torch 100. Various connections or fittings are located at the proximal end of the torch 100. The fittings include a power and cooling liquid fitting 122, a plasma gas offset fitting 124, a shield gas offset fitting 126, a cooling liquid return offset fitting 128, a high frequency starting circuit fitting 130 for a pilot arc conductor, and a plate sensing connection 132 for sensing contact between the torch 100 and the workpiece. Except for the plate sensing connection 132, the various fittings are shown in FIG. 2 as having threaded connections; however other types of connectors could be utilized. The offset fittings 124, 126, 128 help provide the narrow width of the torch 100 are discussed further below.

Figure 4:
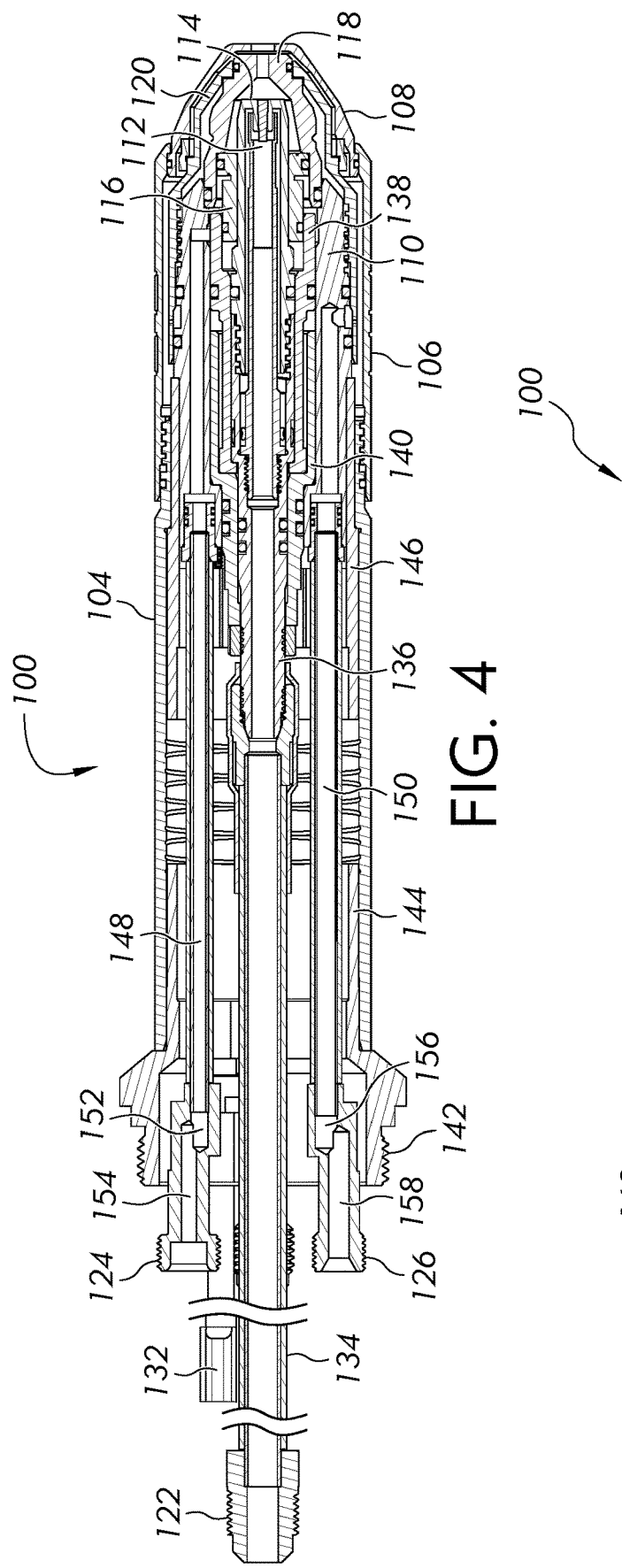
FIG. 4 is a cross-sectional view of the plasma arc torch.

FIG. 4 is a cross-sectional view of the plasma arc torch 100. The power and cooling liquid fitting 122 is located at the proximal end of a coolant supply tube or conduit 134 that conducts electrical current to the cathode 136 and electrode 114 in the torch 100 and also conveys cooling liquid to the distal end of the torch. The cathode 136 is threaded into the distal end of the coolant supply tube 134 and extends along the axis 109 (FIG. 2) of the torch toward the nozzle 118. The cooling tube 112 and electrode 114 are attached to the cathode 136. The inner diameter of the electrode 114 is larger than the outer diameter of the cooling tube 112 so that an interstitial space exists between the electrode and the cooling tube. Cooling liquid is conveyed to the distal end of the torch 100 through the coolant supply tube 134, cathode 136, and the cooling tube 112. The cooling liquid then flows in the interstitial space between the outer surface of the cooling tube 112 and the inner surface of the electrode 114 in the proximal direction, to cool the electrode. As will be discussed further below, after cooling the electrode 114, the cooling liquid also flows through apertures in the cathode 136 and past inner 138 and outer 140 isolators surrounding the cooling tube and electrode and into the nozzle body 110 to cool the nozzle 118. The inner 138 and outer 140 isolators electrically insulate the nozzle body 110 from the cathode 136 and electrode 114.

At the proximal end of the torch 100 is a threaded portion 142 that connects the torch to the handle portion (not shown). Extending distally from the threaded portion 142 is an isolator 144 that insulates the torch body 104 from interior portions of the torch 100. The threaded portion 142 and isolator 144 can be integrally formed, or can be formed as separate components. A further isolator 146 is located in the central portion of the torch 100. The torch body 104 rests on the further isolator 146, which can restrict or set the axial location of the torch body, with internal epoxy used to avoid rotational motion. The various isolators in the torch can be made from nonmetallic materials, such as high temperature plastics. Example high temperature nonmetallic materials include PEEK (polyetheretherketone), polyetherimide (e.g., ULTEM), VESPEL, and the like.

The outer retaining cap 106 is attached to the torch body 104 and holds the shield cap 108 in place. The swirl ring 116 and nozzle 118 are held in place by the inner retaining cap 120, which threads onto the nozzle body 110. The swirl ring 116 imparts a swirling motion to the plasma gas as it passes through the swirl ring.

In addition to the coolant supply tube 134, fluid conduits for the plasma and shield gas are shown in FIG. 4. A plasma gas conduit 148 conveys plasma gas to the nozzle body 110. The plasma gas flows through a passage in the nozzle body 110 and is discharged near the swirl ring 116. A shield gas conduit 150 conveys shield gas to the nozzle body 110. The shield gas flows through a passage the nozzle body 110 and is discharged at a central location along the nozzle body. In an example embodiment, the plasma gas conduit 148 and shield gas conduit 150 extend parallel to the axis 109 (FIG. 2) of the torch. However, the plasma gas conduit 148 and the shield gas conduit 150 could be angled with respect to the axis of the torch if desired.

To help achieve the narrow width of the torch 100, offset fittings are used for various fluid connections. The torch 100 includes a plasma gas offset fitting 124 that is attached to the plasma gas conduit 148 and a shield gas offset fitting 126 that is attached to the shield gas conduit 150. The plasma gas offset fitting 124 includes a first plasma gas duct 152 that is in fluid communication with the plasma gas conduit 148, and a second plasma gas duct 154 that is in fluid communication with the first plasma gas duct. The first plasma gas duct 152 is coupled to the plasma gas conduit 148, and the second plasma gas duct 154 is outwardly radially offset from the first plasma gas duct and extends away from the first plasma gas duct in the proximal direction, parallel to the axis of the torch 100. The shield gas offset fitting 126 includes a first shield gas duct 156 that is in fluid communication with the shield gas conduit 150, and a second shield gas duct 158 that is in fluid communication with the first shield gas duct. The first shield gas duct 156 is coupled to the shield gas conduit 150, and the second shield gas duct 158 is outwardly radially offset from the first shield gas duct and extends away from the first shield gas duct in the proximal direction, parallel to the axis of the torch 100. It can be seen that the offset fittings/connections 124, 126 have an inward jog or axial discontinuity toward the center of the torch 100. The offset fittings 124, 126 provide for fluid communication between two axially-extending ducts or channels that are parallel but radially offset, so that the fluids can be conducted through the torch from the proximal end to the distal end. Conventional plasma arc torches have inline fittings that lack an inward jog as shown and, thus, conventional torches are wider than the present torch. At the proximal end of the torch 100, the offset fittings 124, 126 allow for wider spacing between the fluid tubes and electrical conductors and their connections to fluid/electrical sources, with a closer spacing between the tubes/conductors along the distal portion of the torch. Instead of offset fittings, the torch 100 could utilize bent fluid tubes, but bent fluid tubes are not manufacturing friendly. The offset fittings could be achieved by one or more machined components that could include dissimilar materials.

Figure 5:
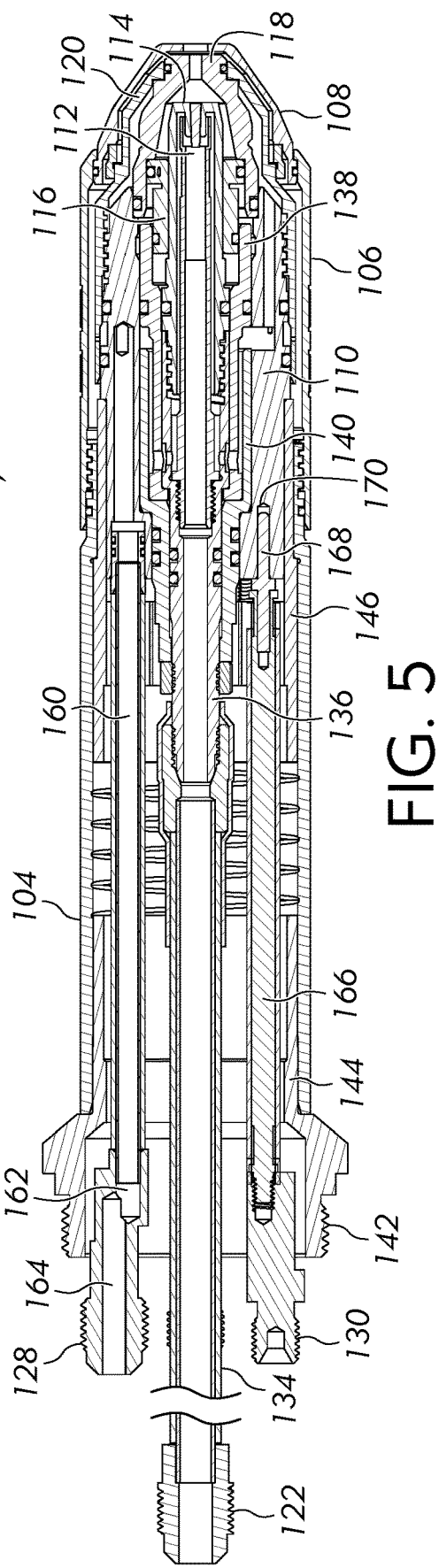
FIG. 5 is a cross-sectional view of the plasma arc torch.

FIG. 5 is a further cross-sectional view of the plasma arc torch 100. The cooling liquid return offset fitting 128 and a cooling liquid return conduit 160 are shown in FIG. 5. After cooling the distal end of the torch 100, cooling liquid flows through a passage in the nozzle body 110 and is conveyed to the proximal end of the torch through the cooling liquid return conduit 160. In an example embodiment, the cooling liquid return conduit 160 extends parallel the axis 109 (FIG. 2) of the torch. However, the cooling liquid return conduit could be angled with respect to the axis of the torch if desired. The cooling liquid return offset fitting 128 is constructed similarly to the plasma and shield gas offset fittings and is attached to the cooling liquid return conduit 160. Like the plasma and shield gas offset fittings, the cooling liquid return offset fitting 128 has an inward jog or axial discontinuity toward the center of the torch 100 to reduce the diameter of the torch while maintaining sufficient spacing between the connections at the proximal end of the torch. The cooling liquid return offset fitting 128 includes a first cooling liquid return duct 162 in fluid communication with the cooling liquid return conduit 160, and a second cooling liquid return duct 164 in fluid communication with the first cooling liquid return duct. The first cooling liquid return duct 162 is coupled to the cooling liquid return conduit 160, and the second cooling liquid return duct 164 is outwardly radially offset from the first cooling liquid return duct and extends away from the first cooling liquid return duct in the proximal direction, parallel to the axis of the torch.

The high frequency starting circuit fitting 130 or pilot arc fitting is also shown in FIG. 5. A pilot arc conductor 166 within the torch 100 conducts high frequency starting current from starting circuitry within a plasma cutting power supply (not shown) to the nozzle body 110. The starting current flows through the fitting 130 to the pilot arc conductor and to the nozzle body 110 to form a pilot arc between the electrode 114 and nozzle 118 during arc starting. A spring compression plug 168 electrically connects the pilot arc conductor 166 to the nozzle body 110. The spring compression plug 168 is similar to a banana plug. In an example embodiment, the spring compression plug 168 is a MULTILAM plug connector available from Stäubli Electrical Connectors AG. The nozzle body 110 has a bore 170 that receives the spring compression plug 168. The spring compression plug 168 has flexible, spring elements that are compressed when the connector is inserted into the bore 170. The spring compression plug 168 facilitates rotation and repositioning of the nozzle body 110 while it is connected to the pilot arc conductor 166 during assembly of the torch 100.

Figure 8:
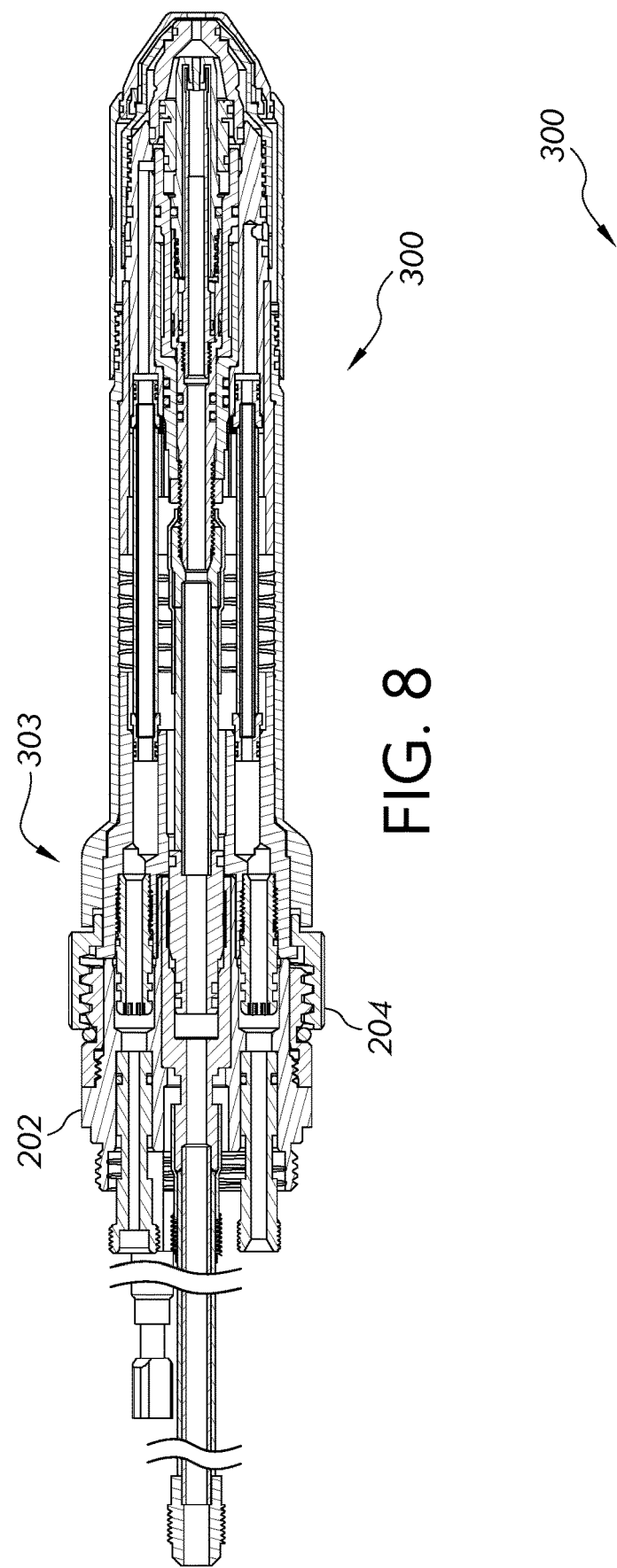
FIG. 8 is a cross-sectional view of a third embodiment of the plasma arc torch.
Figure 9:
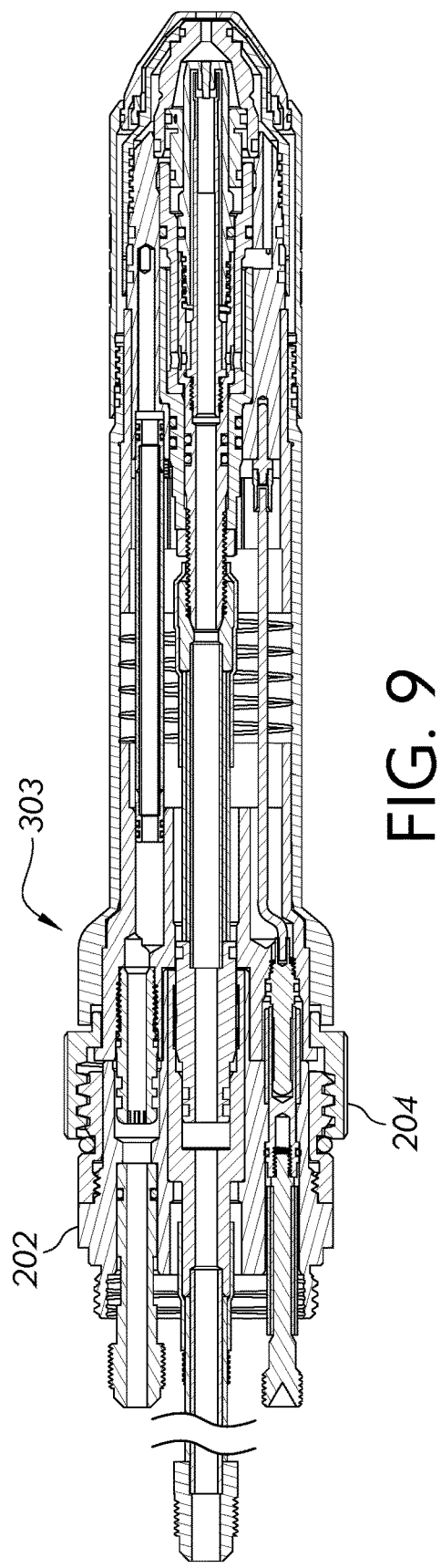
FIG. 9 is a cross-sectional view of the third embodiment of the plasma arc torch.

FIGS. 6 and 7 show a first quick disconnect embodiment of a plasma arc torch 200 and FIGS. 8 and 9 show a second quick disconnect embodiment of a plasma arc torch 300. The plasma arc torch in FIGS. 6 and 7 is shorter than the torch in FIGS. 8 and 9. Both torches 200, 300 have a torch base 202 that connects the torch to the handle portion (not shown). Distal of the torch base 202 is a torch head 203, 303 that is readily separated from the torch base. The torch head 203, 303 includes a threaded connection collar 204 that secures the torch head to the torch base and allows the torch head to be removed from the torch base. The fluid and electrical connections between the torch head 203, 303 and torch base 202 separate as the threaded connection collar 204 is removed from the torch base. In particular, male adaptors in the torch head 203, 303 unplug from female receptacles in the torch base 202 as the threaded connection collar 204 is removed from the torch base. Although the quick disconnect between the torch base 202 and the torch head 203, 303 is shown as a threaded connection, other quick disconnect styles could be used in the torches 200, 300, such as snap type or ball latching, bayonet latching, etc.

In FIGS. 6 and 7, the outer retaining cap, inner retaining cap, shield cap, nozzle, swirl ring, and electrode are not shown. The nozzle body 110 and torch body 206 are shown in FIGS. 6 and 7, along with various other torch components discussed above. It can be seen that the torch body 206 is much shorter than the torch bodies shown in FIGS. 4, 5, 8 and 9. The fluid conduits and pilot arc conductor are also shorter in the torch embodiment of FIGS. 6 and 7.

The power and cooling liquid fitting 122 is located at the proximal end of a first coolant supply tube 208. The cathode 136 is threaded into the distal end of a second coolant supply tube 210 that can be disconnected from the first coolant supply tube 208 when the torch head 203 is removed from the torch base 202. The torch base 202 includes a female receptacle 212 for supplying the cooling liquid and electrical power to the torch head 203, and the second coolant supply tube 210 plugs into the female receptacle. The second coolant supply tube 210 can include seals, such as O-rings that seal against the female receptacle 212.

The torch base 202 further includes a shield gas connection 214 and a plasma gas connection 216 and associated female receptacles 218, 220. The torch head 203 includes fluid carry tubes or adaptors 222, 224 that plug into the female receptacles 218, 220. The fluid carry tubes or adaptors 222, 224 can include seals, such as O-rings that seal against the female receptacles 218, 220. Although female receptacles are shown in the torch base 202 and male plugs are shown in the torch head 203, this is merely exemplary and any of the connections discussed herein can be modified so that the male plug is in the torch base and the female receptacle in the torch head.

The fluid carry tube or adaptor 222 for the shield gas is threaded into the shield gas offset fitting 226, and the fluid carry tube or adaptor 224 for the plasma gas is threaded into the plasma gas offset fitting 228. The shield gas offset fitting 226 conveys the shield gas to a short shield gas conduit 230, and the plasma gas offset fitting 228 conveys the plasma gas to a short plasma gas conduit 232. The shape of the ducts within the shield and plasma gas offset fittings 226, 228 are similar to the offset fittings discussed above with respect to FIGS. 4 and 5 in that they have an inward jog or axial discontinuity toward the center of the torch 200, and that they extend parallel to each other in opposite directions.

The cooling liquid return fitting 234 and high frequency starting circuit fitting 236 or pilot arc fitting are shown in FIG. 7. The torch base 202 includes a female receptacle 238 for the cooling liquid return fluid carry tube or adaptor 240, which can seal against the receptacle as discussed above. The cooling liquid return fluid carry tube or adaptor 240 is threaded into the cooling liquid return offset fitting 242. The cooling liquid return offset fitting 242 conveys to the proximal end of the torch the cooling liquid that returns from the nozzle body 110. The cooling liquid return offset fitting 242 receives the cooling liquid from a short cooling liquid return conduit 244, and the cooling liquid flows through the offset fitting to the adaptor 240 and into the torch base 202.

The high frequency starting circuit fitting 236 or pilot arc fitting is electrically connected to the pilot arc conductor 246 through an adaptor plug 248 in the torch head 203. The pilot arc conductor 246 has an inward jog toward the center of the torch 200, similar to the offset fittings discussed above for fluid flow through the torch. A spring compression plug 250 similar to the spring compression plug discussed above with respect to FIG. 5 electrically connects the pilot arc conductor 246 to the nozzle body 110.

Because the torch 200 may be frequently disconnected, there is the possibility that coolant may drip into the torch as the torch is disconnected. The coolant can accumulate in internal voids in the torch 200 and increase the likelihood of undesired arcing or arc overs within the torch. To reduce the likelihood of such arc over events, the offset fittings 226, 228, 242 can be constructed from a high temperature nonmetallic, electrically insulating material, such as a high temperature plastic. Example high temperature nonmetallic, electrically insulating materials include PEEK (polyetheretherketone), polyetherimide (e.g., ULTEM), VESPEL, and the like. The offset fittings 226, 228, 242 act as electrical insulators. At the distal end of the offset fittings 226, 228, 242 are axially-extending isolators 252 located between the torch body 206 and the nozzle body 110. The offset fittings 226, 228, 242 and isolators 252 can be monolithically or integrally formed, or can be formed as separate components. Moreover, the offset fittings 226, 228, 242 and a passage for the pilot arc conductor 246 can be monolithically or integrally formed from the high temperature nonmetallic material as a single isolator component having the various ducts described above, or they can be formed as two or more separate components.

As noted above, FIGS. 8 and 9 show a second quick disconnect embodiment of a plasma arc torch 300 that is longer than the torch shown in FIGS. 6 and 7. The torch shown in FIGS. 8 and 9 will not be discussed in detail because it has features already discussed above. The proximal half of the torch 300 includes the torch base 202 and a threaded connection collar 204 on the torch head 303 for disconnecting the torch head from the torch base. The torch head 303 also includes offset fittings and male fluid carry tubes or adaptors and a pilot arc adaptor plug that plug into respective female receptacles in the torch base 202 as discussed above with respect to FIGS. 6 and 7. The distal half of the torch 300 is structurally similar to the torch shown in FIGS. 4 and 5 and discussed above.

Figure 10:
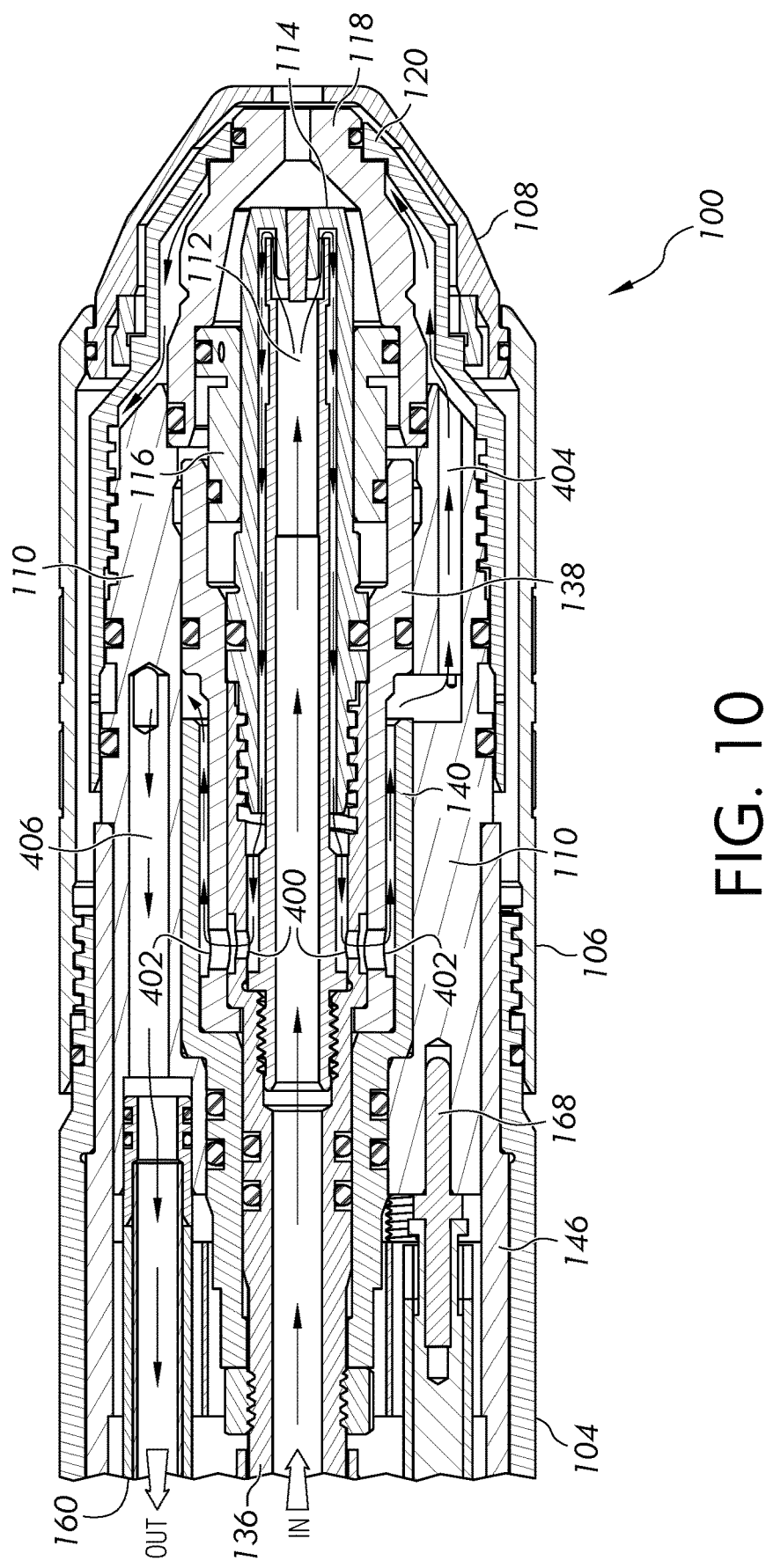
FIG. 10 shows a coolant flow path in a plasma arc torch.

FIG. 10 shows a coolant flow path at the distal end of the plasma arc torch 100. FIG. 10 is a detailed view of the distal end of the torch 100 cross section shown in FIG. 5. However, the coolant flow path shown and described is also applicable to the torch embodiments of FIGS. 6-9. The flow path of the cooling liquid at the distal end of the torch 100 is shown by arrows in FIG. 10. Cooling liquid is conveyed to the distal end of the torch 100 through the coolant supply tube, cathode 136, and the cooling tube 112. The inner diameter of the electrode 114 is larger than the outer diameter of the cooling tube 112 so that an interstitial space exists between the electrode and the cooling tube. The cooling liquid initially flows inside of the cooling tube 112 to the distal end of the electrode 114. The cooling liquid then flows within the electrode 114 in the interstitial space between the outer surface of the cooling tube 112 and the inner surface of the electrode 114 in the proximal direction as shown, to cool the electrode. The cathode 136 has a first plurality of cooling liquid apertures 400. The apertures 400 can be arranged as a ring of holes through the cathode wall that are located circumferentially around the cathode 136 and that let the cooling liquid escape from the cathode radially (in the radial direction). The inner isolator 138 that is located around the cathode 136 and the electrode 114 has a second plurality of cooling liquid apertures 402. The second plurality of cooling liquid apertures 402 can be arranged as a ring of holes through the inner isolator 138, similar to the apertures 400 in the cathode 136. The first plurality of cooling liquid apertures 400 and the second plurality of cooling liquid apertures 402 are in fluid communication so that the cooling liquid can flow radially through the cathode 136 and through the inner isolator 138 as shown. In certain embodiments, the first plurality of cooling liquid apertures 400 and the second plurality of cooling liquid apertures 402 are aligned with each other; however the apertures 400, 402 need not be aligned with each other if the cooling liquid can flow circumferentially in between cathode 136 and the inner isolator 138. The outer isolator 140 is radially offset from the inner isolator 138 to form an interstitial space through which the cooling liquid is conveyed into nozzle body 110. After the cooling liquid flows in the proximal direction between the cooling tube 112 and the electrode 114, the cooling liquid flows radially through the first and second plurality of apertures 400, 402 and then in the distal direction in the interstitial space between the inner isolator 138 and the outer isolator 140. The cooling liquid then flows into one or more openings in the nozzle body 110 and distally through a plurality of internal cooling liquid channels 404 in the nozzle body. The internal cooling liquid channels 404 in the nozzle body 110 are short and narrow, such as less than one inch long (e.g., less than 25 mm) and less than 0.1 inch in diameter (e.g., less than 0.25 mm), and together provide a small pressure drop for the cooling liquid. In an example embodiment, the nozzle body 110 includes three internal cooling liquid channels 404; however, it is to be appreciated that the nozzle body could include fewer or more than three cooling liquid channels depending on the torch's cooling requirements. The cooling liquid exits the internal cooling liquid channels 404 in the nozzle body 110 and flows between the inner retaining cap 120 and the nozzle 118 to cool the nozzle. The cooling liquid then flows into another opening in the nozzle body 110 and proximally through a second internal cooling liquid channel 406. The second internal cooling liquid channel 406 is in fluid communication with cooling liquid return conduit 160 for recirculation out of the torch 100.

It can be seen that a distal terminal end of the outer isolator 140 is radially offset from the inner isolator 138 such that the interstitial space between the isolators extends to the distal terminal end of the outer isolator. A proximal terminal end of the inner isolator 138 contacts an inner wall of the outer isolator 140, and the second plurality of cooling liquid apertures 402 is located just distal of the proximal terminal end of the inner isolator. The inner isolator 138 extends distal of the outer isolator 140 and the outer isolator extends proximal of inner isolator. The outer isolator 140 lacks cooling liquid apertures, such as those found on the inner isolator 138. The inner and outer isolators 138, 140 provide a low pressure drop for the cooling liquid while at the same time not reducing the arc over distance separating electrically-conductive parts of the plasma arc torch 100.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:
1. A plasma arc torch, comprising:
a cathode extending along an axis of the torch in a distal direction toward an electrode attached to the cathode, and having a first plurality of cooling liquid apertures;
a nozzle;
a nozzle body having an internal cooling liquid channel that conveys cooling liquid toward the nozzle, wherein the nozzle body is an anode of the plasma arc torch;
an inner isolator having a second plurality of cooling liquid apertures in fluid communication with the first plurality of cooling liquid apertures;
an outer isolator radially offset from the inner isolator to form an interstitial space through which the cooling liquid is conveyed into nozzle body, wherein a distal terminal end of the outer isolator is radially offset from the inner isolator such that the interstitial space extends to the distal terminal end of the outer isolator and the inner isolator extends distal of the outer isolator and the outer isolator extends proximal of the inner isolator, and wherein the inner isolator and the outer isolator electrically insulate the nozzle body from the cathode;
a cooling liquid return conduit; and
a cooling liquid return offset fitting including a first cooling liquid return duct in fluid communication with the cooling liquid return conduit, and a second cooling liquid return duct in fluid communication with the first cooling liquid return duct, wherein the first cooling liquid return duct is coupled to the cooling liquid return conduit, and the second cooling liquid return duct is outwardly radially offset from the first cooling liquid return duct and extends away from the first cooling liquid return duct in a proximal direction, parallel to the axis of the torch.

2. The plasma arc torch of claim 1, wherein the internal cooling liquid channel is less than one inch long and less than 0.1 inch in diameter.

3. The plasma arc torch of claim 1, wherein a proximal terminal end of the inner isolator contacts an inner wall of the outer isolator, and the second plurality of cooling liquid apertures is located distal of the proximal terminal end of the inner isolator.

4. The plasma arc torch of claim 1, wherein the cooling liquid return offset fitting is made from an electrically insulating material.

5. The plasma arc torch of claim 4, wherein plasma arc torch comprises a torch head and a torch base, and the torch head comprises a threaded connection collar for attaching the torch head to the torch base.

6. The plasma arc torch of claim 1, further comprising: a plasma gas conduit; and
a plasma gas offset fitting including a first plasma gas duct in fluid communication with the plasma gas conduit, and a second plasma gas duct in fluid communication with the first plasma gas duct, wherein the first plasma gas duct is coupled to the plasma gas conduit, and the second plasma gas duct is outwardly radially offset from the first plasma gas duct and extends away from the first plasma gas duct in a proximal direction away from the electrode, parallel to the axis of the torch.

7. The plasma arc torch of claim 1, further comprising: a shield gas conduit; and
a shield gas offset fitting including a first shield gas duct in fluid communication with the shield gas conduit, and a second shield gas duct in fluid communication with the first shield gas duct, wherein the first shield gas duct is coupled to the shield gas conduit, and the second shield gas duct is outwardly radially offset from the first shield gas duct and extends away from the first shield gas duct in a proximal direction away from the electrode, parallel to the axis of the torch.

8. The plasma arc torch of claim 1, further comprising: a pilot arc conductor; and
a spring compression plug electrically connecting the pilot arc conductor to the nozzle body.

9. A plasma arc torch, comprising:
a cathode extending along an axis of the torch in a distal direction toward an electrode attached to the cathode;
a pilot arc conductor;
a nozzle body that is an anode of the plasma arc torch;
a plasma gas conduit;
a shield gas conduit;
a cooling liquid return conduit;
a plasma gas offset fitting including a first plasma gas duct in fluid communication with the plasma gas conduit, and a second plasma gas duct in fluid communication with the first plasma gas duct, wherein the second plasma gas duct is outwardly radially offset from the first plasma gas duct and extends away from the first plasma gas duct in a proximal direction away from the electrode, parallel to the axis of the torch;
a shield gas offset fitting including a first shield gas duct in fluid communication with the shield gas conduit, and a second shield gas duct in fluid communication with the first shield gas duct, wherein the second shield gas duct is outwardly radially offset from the first shield gas duct and extends away from the first shield gas duct in the proximal direction, parallel to the axis of the torch;
a cooling liquid return offset fitting including a first cooling liquid return duct in fluid communication with the cooling liquid return conduit, and a second cooling liquid return duct in fluid communication with the first cooling liquid return duct, wherein the second cooling liquid return duct is outwardly radially offset from the first cooling liquid return duct and extends away from the first cooling liquid return duct in the proximal direction, parallel to the axis of the torch; and
a spring compression plug electrically connecting the pilot arc conductor to the nozzle body.

10. The plasma arc torch of claim 9, wherein the cathode includes a first plurality of cooling liquid apertures, and the nozzle body includes an internal cooling liquid channel that conveys cooling liquid toward a nozzle of the torch, wherein the torch further comprises:
an inner isolator having a second plurality of cooling liquid apertures in fluid communication with the first plurality of cooling liquid apertures; and
an outer isolator radially offset from the inner isolator to form an interstitial space through which the cooling liquid is conveyed into nozzle body, wherein a distal terminal end of the outer isolator is radially offset from the inner isolator such that the interstitial space extends to the distal terminal end of the outer isolator and the inner isolator extends distal of the outer isolator and the outer isolator extends proximal of the inner isolator, and wherein the inner isolator and the outer isolator electrically insulate the nozzle body from the cathode.

11. The plasma arc torch of claim 10, wherein the internal cooling liquid channel is less than one inch long and less than 0.1 inch in diameter.

12. The plasma arc torch of claim 10, wherein a proximal terminal end of the inner isolator contacts an inner wall of the outer isolator, and the second plurality of cooling liquid apertures is located distal of the proximal terminal end of the inner isolator.

13. The plasma arc torch of claim 9, wherein the plasma gas offset fitting, the shield gas offset fitting, and the cooling liquid return offset fitting are integrally formed from an electrically insulating material.

14. The plasma arc torch of claim 10, wherein plasma arc torch comprises a torch head and a torch base, and the torch head comprises a threaded connection collar for attaching the torch head to the torch base.

* * * * *